United States Patent
Kamasaka et al.

(10) Patent No.: US 6,240,455 B1
(45) Date of Patent: May 29, 2001

(54) INTERNET SERVER PROVIDING LINK DESTINATION DELETION, ALTERATION, AND ADDITION

(75) Inventors: Hitoshi Kamasaka; Hiroaki Shiraki; Masashi Torato, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/115,913

(22) Filed: Jul. 15, 1998

(30) Foreign Application Priority Data

Dec. 1, 1997 (JP) .................................................. 9-330036

(51) Int. Cl.[7] ...................................................... G06F 15/16
(52) U.S. Cl. ........................... 709/229; 709/200; 709/203; 709/217; 709/219; 709/225; 709/246
(58) Field of Search .................................... 709/200, 203, 709/217, 219, 225, 229, 246

(56) References Cited

U.S. PATENT DOCUMENTS

| | | | |
|---|---|---|---|
| 5,678,041 | 10/1997 | Baker et al. .......................... | 395/609 |
| 5,717,860 * | 2/1998 | Graber et al. ........................ | 709/227 |
| 5,751,956 * | 5/1998 | Kirsch ................................... | 709/203 |
| 5,761,683 * | 6/1998 | Logan et al. ......................... | 707/513 |
| 5,764,906 * | 6/1998 | Edelstein et al. .................... | 709/219 |
| 5,793,972 * | 8/1998 | Shane ................................... | 709/219 |
| 5,802,299 * | 9/1998 | Logan et al. ......................... | 709/218 |
| 5,812,769 * | 9/1998 | Graber et al. ........................ | 709/228 |
| 5,812,776 * | 9/1998 | Gifford ................................. | 709/217 |
| 5,822,539 * | 10/1998 | Hoff ..................................... | 709/236 |
| 5,937,404 * | 8/1999 | Csaszar et al. ....................... | 707/9 |
| 5,944,790 * | 8/1999 | Levy .................................... | 709/218 |
| 5,963,208 * | 10/1999 | Dolan et al. .......................... | 345/357 |
| 5,968,125 * | 10/1999 | Garrick et al. ....................... | 709/224 |
| 5,974,455 * | 10/1999 | Monier ................................. | 709/223 |
| 5,983,244 * | 11/1999 | Nation .................................. | 707/501 |
| 5,995,099 * | 11/1999 | Horstmann ........................... | 345/335 |
| 6,018,748 * | 1/2000 | Smith ................................... | 707/501 |
| 6,020,884 * | 2/2000 | MacNaughton et al. ............ | 345/329 |
| 6,041,360 * | 3/2000 | Himmel et al. ...................... | 709/245 |
| 6,049,821 * | 4/2000 | Theriault et al. .................... | 709/203 |

FOREIGN PATENT DOCUMENTS

| | | |
|---|---|---|
| 3-95673 | 4/1991 | (JP) . |
| 3188550 | 8/1991 | (JP) . |
| 4280317 | 10/1992 | (JP) . |
| 6-28355 | 2/1994 | (JP) . |
| 8-115332 | 5/1996 | (JP) . |
| 9-26975 | 1/1997 | (JP) . |
| 9-62704 | 2/1997 | (JP) . |

* cited by examiner

*Primary Examiner*—Saleh Najjar
(74) *Attorney, Agent, or Firm*—Leydig, Voit & Mayer, Ltd.

(57) ABSTRACT

A server includes an access permission determining section determining, when link information is contained in server information to be transmitted to a client, whether a user of the client is permitted access to the server information represented as a destination of a link by the link information, and a link information deletion section transmitting, when the user of the client is denied access by the access permission determining section, the server information to the client after deleting the link information from the server information.

11 Claims, 13 Drawing Sheets

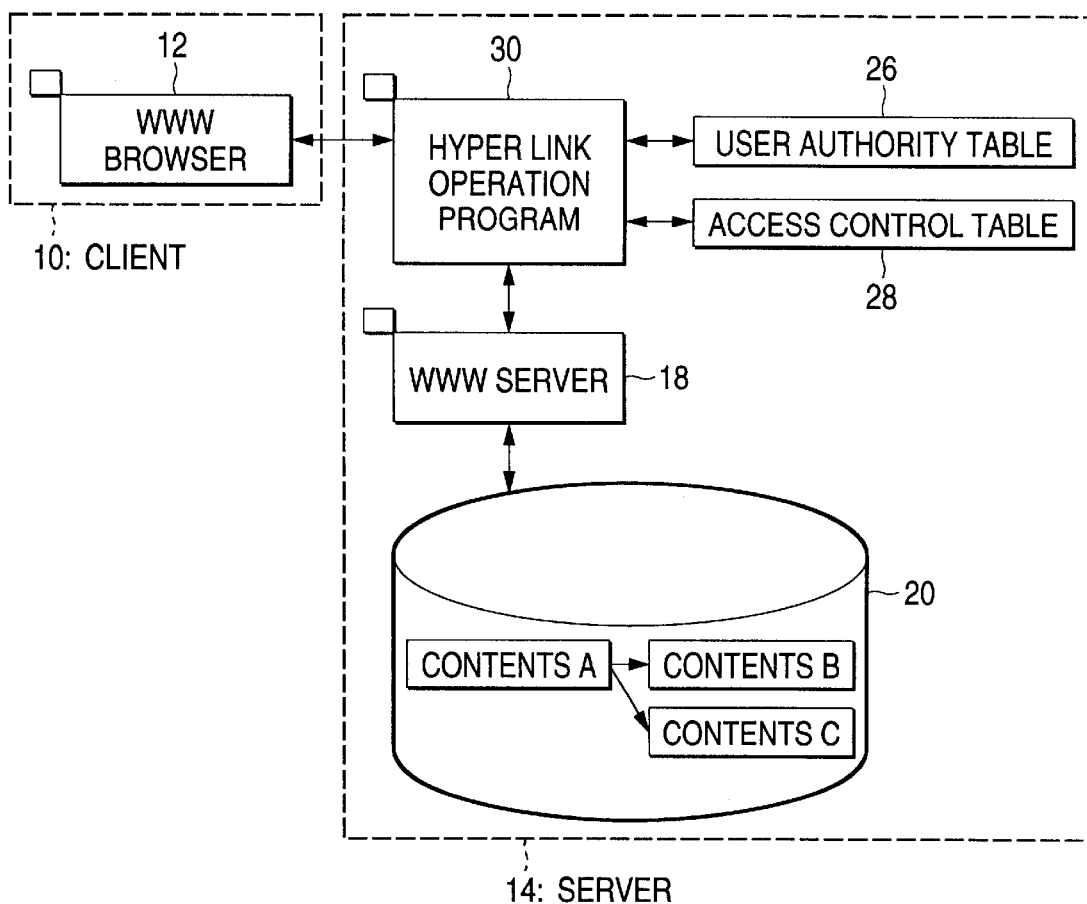

FIG. 6

| USER IDENTIFICATION INFORMATION | AUTHORITY LEVEL |
|---|---|
| USER A | 3 |
| USER B | 2 |
| USER C | 1 |
| ⋮ | ⋮ |

26: USER AUTHORITY TABLE

FIG. 7

| URL | ACCESS RIGHT CONDITION |
|---|---|
| URL CONTENTS A | 1, 2, 3 |
| URL CONTENTS B | 1, 2 |
| URL CONTENTS C | 1, 3 |
| ⋮ | ⋮ |

28: ACCESS CONTROL TABLE

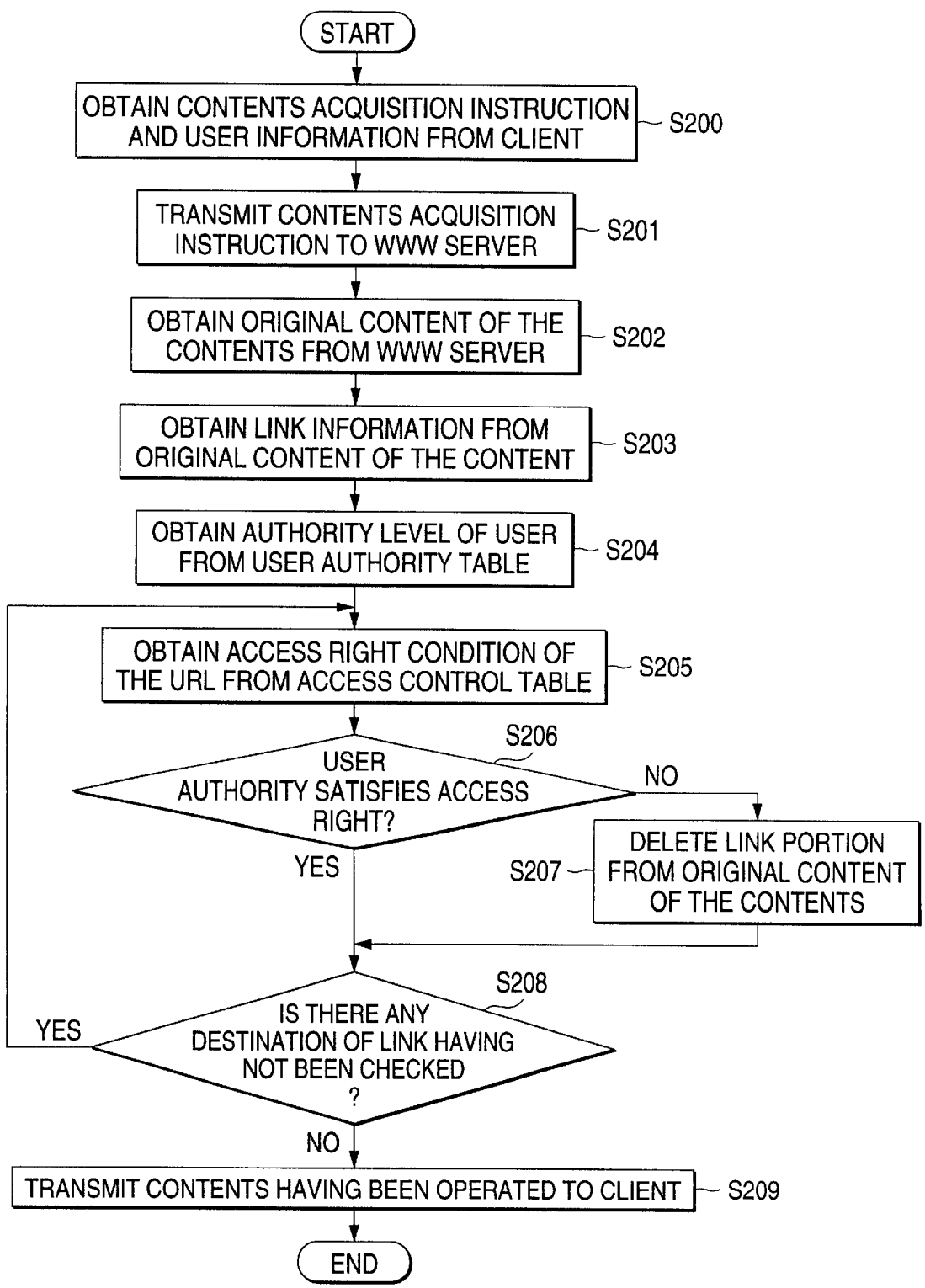

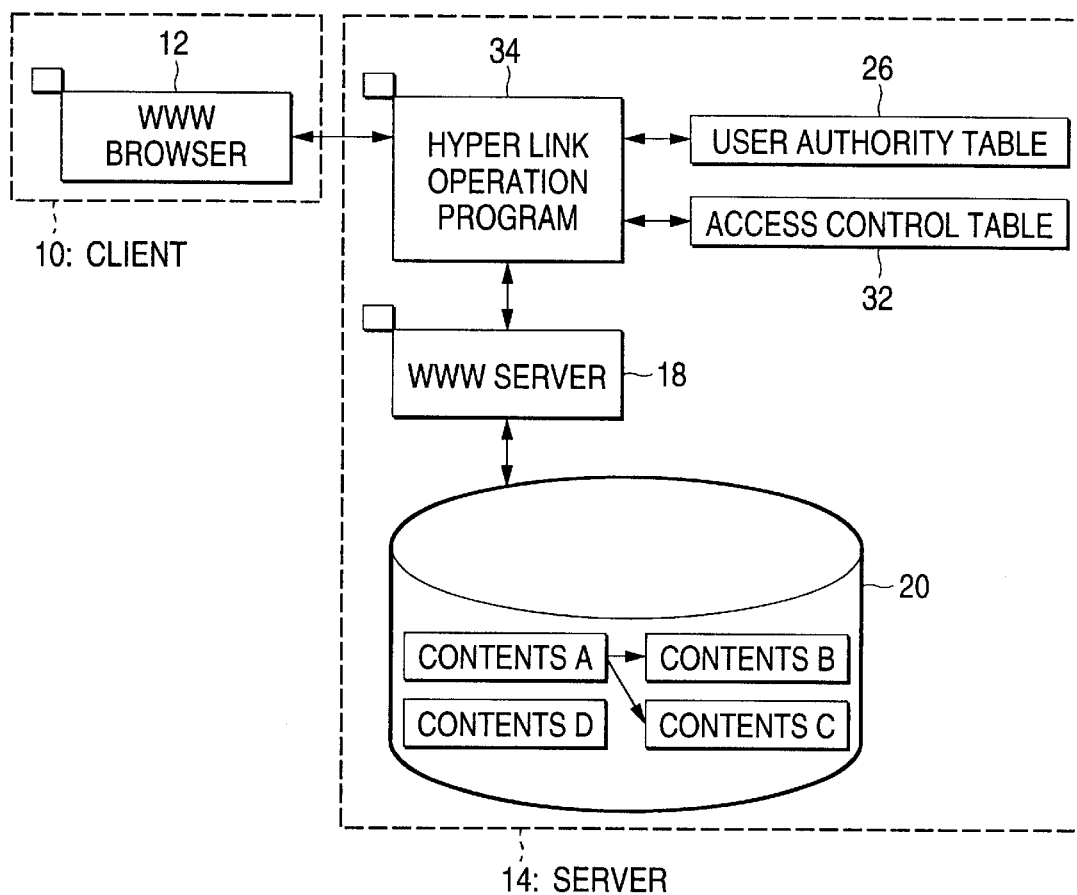

Contents A is constructed by contents B and < A href = URL contents D > contents C < /A >.

(24d marks the `< A href = URL` and `< /A >` portions)

Contents A is constructed by contents B and contents C.

FIG. 14

| KEY WORD | ACCESS URL |
|---|---|
| CONTENTS A | URL CONTENTS A |
| CONTENTS B | URL CONTENTS B |
| CONTENTS C | URL CONTENTS C |
| ⋮ | ⋮ |

36: KEY WORD TABLE

FIG. 16A

Contents A is constructed by contents B and contents C.

FIG. 16B

< A href = URL contents A > contents A < /A > is constructed by
< A href = URL contents B > contents B < /A > and
< A href = URL contents C > contents C < /A >.

FIG. 16C

Contents A is constructed by contents B and contents C.

FIG. 17

| KEY WORD | ACCESS RIGHT CONDITION | ACCESS URL |
|---|---|---|
| CONTENTS A | 1, 2, 3 | URL CONTENTS A |
| CONTENTS B | 1, 2 | URL CONTENTS B |
| CONTENTS C | 1, 2, 3 | URL CONTENTS C |
|  |  |  |

40 : KEY WORD ACCESS CONTROL TABLE

FIG. 19A    Contents A is constructed by contents B and contents C.

FIG. 19B    < A href = URL contents A > contents A < /A > is constructed by contents B and < A href = URL contents C > contents C < /A >.

FIG. 19C    Contents A is constructed by contents B and contents C.

FIG. 20

| KEY WORD | ACCESS RIGHT CONDITION | ACCESS URL |
|---|---|---|
| CONTENTS A | 1, 2, 3 | URL CONTENTS A |
| CONTENTS B | 1, 2 | URL CONTENTS B |
| CONTENTS C | 1 | URL CONTENTS C |
| CONTENTS D | 3 | URL CONTENTS D |
| ⋮ | ⋮ | ⋮ |

42 : KEY WORD ACCESS CONTROL TABLE

FIG. 21A    Contents A is constructed by contents B and contents C.

FIG. 21B    < A href = URL contents A > contents A < /A > is constructed by contents B and < A href = URL contents D > contents C < /A >.

FIG. 21C    Contents A is constructed by contents B and contents C.

INTERNET SERVER PROVIDING LINK DESTINATION DELETION, ALTERATION, AND ADDITION

BACKGROUND OF THE INVENTION

1. Field of the Invention

The present invention relates to a server and, in particular, to a technique for controlling access to information stored in a server (hereinafter called server information).

2. Description of the Related Art

In recent years, a world wide web (WWW) system has been spread in which a signal (uniform resource locator: URL) requesting user's desired server information (contents) is sent from a client to a server and the server transmits the required server information to the client.

In such a system, in the case of limiting a user's access to the server information, the access control function of an operating system (OS) operated on the server is usually utilized. For example, when the attribute of a file in which server information is recorded is set so as not to be able to be read by a certain user, the user can not receive the file from the server even if a signal requesting the server information recorded in the file is sent from the client to the server. In this manner, it is easily performed to limit a predetermined user's access to the server information by utilizing the access control function of the OS.

However, according to such a technique, each of users can not be determined as to whether or not the each user has access right to server information based on the access control until the each user actually accesses the server information. Accordingly, when server information includes many link information each linked to server information to which a user has no access right, the user is obliged to repeatedly and wastefully access to server information, whereby there arise a problem that the user must waste time upon accessing.

In most cases, the server information to which some users have no access right is generally important data. According to the aforesaid technique, at least the presence of the server information to which the access right is not permitted is known to the users. Thus, some of the users may illegally try to access the server to which the access right is not permitted at any cost.

One of general techniques for controlling the access to a file is a file management method disclosed in JP-A 4-280317. According to this method, when a user has no access right to a file, an icon corresponding to the file is not displayed on a display device. Thus, according to this technique, the presence of a file to which a user has no access right can be concealed from the user.

However, when such a method is applied as it is to a distributing system of hyper link information such as a WWW system, even if the presence of other hyper link information can be concealed, display information to be generated from the original hyper link information is reduced. As a consequence, there arises a problem that all information originally intended by a person who prepared the server information can not be transmitted from a server.

SUMMARY OF THE INVENTION

The present invention has been made in view of the aforesaid problem. An object of the present invention is to provide a server which is able to, without reducing an amount of display information of server information to be transmitted, restrain the access method to other server information associated with the server information from being leaked to users in a predetermined range.

In order to solve the aforesaid problem, the server according to the first invention includes an access permission determining section for determining, when link information is contained in server information to be transmitted to a client, whether or not a user of the client is permitted to access to the server information which is represented as a destination of a link by the link information; and a link information deletion section for transmitting, when it is determined that the user of the client is rejected to access by the access permission determining section, the server information to the client after deleting the link information from the server information.

The server according to the second invention is arranged in a manner that, in the server according to the first invention, the access permission determining section determines a class of user's authorization and determines depending on the class of the user's authorization thus determined whether or not the user is permitted to access to the server information.

The server according to the third invention includes a link destination changing section for changing, when server information is transmitted to a predetermined user, a predetermined link information contained in the server information in such a manner that the link information represents, as a destination of the link, second server information different from first server information represented by the link information.

The server according to the fourth invention is arranged in a manner that, in the server according to the third invention, the link destination changing section includes: a memory section which correspondingly stores therein, with respect to the predetermined user, server information specifying information for specifying the first server information and alternative server information specifying information for specifying the second server information to be transmitted to the user in place of the first server information; and a link information changing section for changing, when a user of a client is the predetermined user and server information to be transmitted to the client includes link information representing the first server information specified by the server information specifying information stored in the memory section as a destination of a link, the link information in a manner that the link information represents as a new destination of a link the second server information specified by the alternative server information specifying information stored in the memory section in correspondence with the server information specifying information corresponding to the link information.

The server according to the fifth invention is arranged in a manner that, in the server according to the third invention, the predetermined user is determined on a basis of a class of user's authorization.

The server according to the sixth invention comprises a memory section for correspondingly storing a key word and server information specifying information for specifying server information, and a link information adding section for adding, when original server information has the key word stored in the memory section at a time of transmitting the server information to a client, to the original server information with link information representing as a destination of a link, the server information specified by the server information specifying information stored in the memory section in correspondence with the key word.

The server according to the seventh invention is arranged in a manner that, in the server according to the sixth invention, the memory section further includes user class information representing a class of a user, and the link information adding section adds when server information has the key word stored in the memory section at a time of transmitting the server information to a client and when a user corresponds to the class represented by the user class information stored in the memory section, to the original server information with link information representing as a destination of a link, the server information specified by the server information specifying information stored in the memory section in correspondence with the key word.

The server according to the eighth invention is arranged in a manner that, in the server according to the seventh invention, the memory section further stores a different user class information and a different server information specifying information in correspondence with a key word.

BRIEF DESCRIPTION OF THE DRAWINGS

Similar reference characters denote corresponding features consistently throughout the attached drawings. The preferred embodiments of this invention will be described in detail, with reference to the following figures, wherein:

FIGS. 4A and 4B are diagrams for explaining the operation processing of the server information of the hyper link operation program according to the first embodiment of the present invention;

FIG. 5 is a diagram showing the arrangement of the communication system according to a second embodiment of the present invention;

FIG. 6 is a diagram showing a user authority table according to the second embodiment of the present invention;

FIG. 7 is a diagram showing an access control table according to the second embodiment of the present invention;

FIG. 8 is a diagram showing a flow chart for explaining the operation of the hyper link operation program of the communication system according to the second embodiment of the present invention;

FIG. 9 is a diagram showing the arrangement of the communication system according to a third embodiment of the present invention;

FIG. 10 is a diagram showing an access control table according to the third embodiment of the present invention;

FIG. 14 is a diagram showing a key word table according to a fourth embodiment of the present invention.

FIGS. 16A to 16C are diagrams for explaining the operation processing of the server information of the hyper link operation program according to the fourth embodiment of the present invention.

FIG. 17 is a diagram showing a key word access table according to a fifth embodiment of the present invention.

FIGS. 19A to 19C are diagrams for explaining the operation processing of the server information of the hyper link operation program according to the fifth embodiment of the present invention;

FIG. 20 is a diagram showing a modified example of the key word access table according to the fifth embodiment of the present invention;

FIGS. 21A to 21C are diagrams for explaining the operation processing of the server information using the key word access control table shown in FIG. 20.

DETAILED DESCRIPTION OF THE PREFERRED EMBODIMENTS

The embodiments of the present invention will be explained with reference to the accompanying drawings.

Embodiment 1

Figures 1, 2A, 2B:
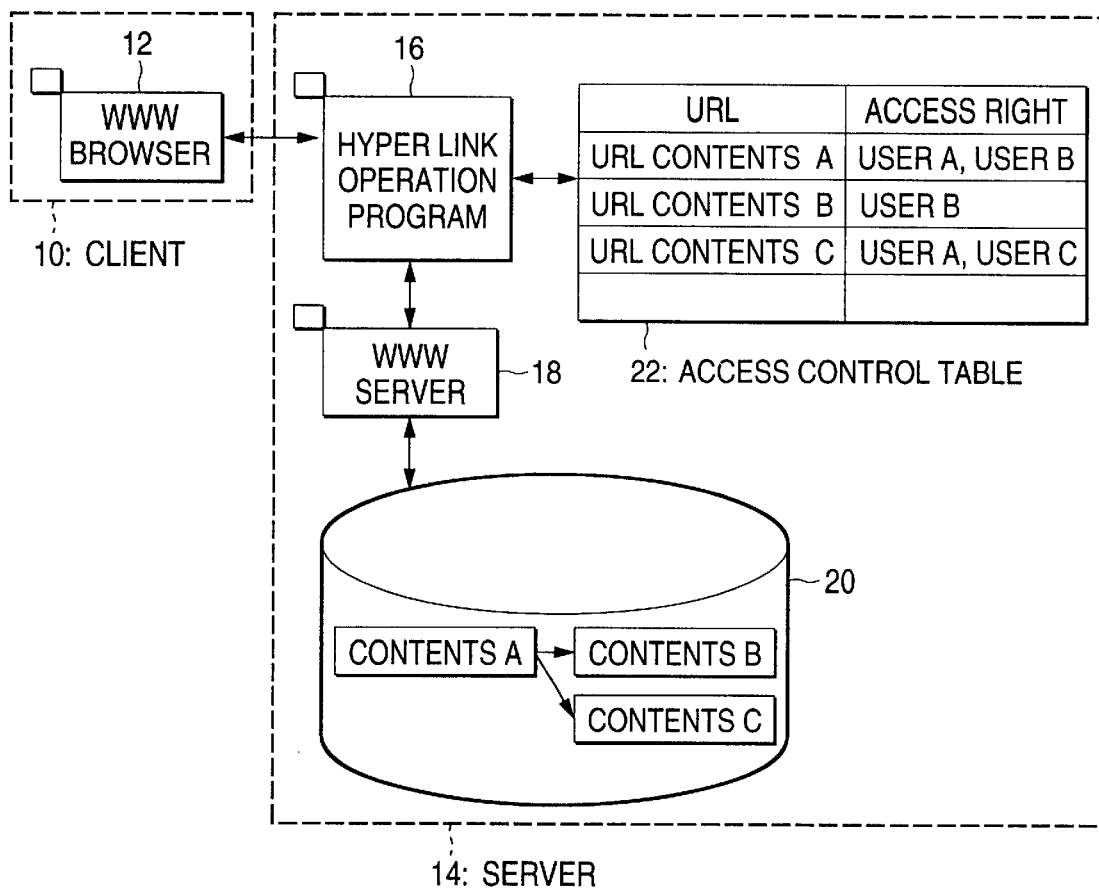
FIG. 1 is a diagram showing the arrangement of the communication system according to a first embodiment of the present invention.
FIGS. 2A and 2B are diagrams showing server information stored in the disk device of the server according to the first embodiment of the present invention.

FIG. 1 is a diagram showing the arrangement of the communication system according to a first embodiment of the present invention. In this figure, a client 10 is arranged to include a WWW browser 12 so that when the client transmits a request signal to a server 14, the client receives server information corresponding to the request signal from the server 14. The WWW browser 12 serves to display information based on the received server information.

The server 14 is constructed by an information processing apparatus such as a personal computer (PC) and includes a hyper link operation program 16, a WWW server 18, a disk device 20, and an access control table 22.

The disk device 20 stores therein the server information, that is, contents A, B and C, to be transmitted to the client 10. In the figure, each of arrows shown between the contents A and B and arrows shown between the contents A and C represents the direction of a hyper link.

FIG. 2A is a diagram showing the original server information of the contents A. As shown in this figure, the contents A includes link information 24b to the contents B and link information 24c to the contents C. Accordingly, when the contents A is transmitted to the client 10 as it is, the WWW browser 12 interprets the link information 24b and 24c contained in the contents A. Then, the character sequences "contents B" and "contents C" are displayed on a display device in a manner that they are underlined so as to be identified, as shown in FIG. 2B. In this state, when a user designates and inputs the underlined character sequence displayed on the display device by using a pointing device such as a mouse etc., a request signal requesting the contents B or C is newly transmitted to the server 14. In this case, since the information shown in FIG. 2A is transmitted to the client, a user of the client is able to know paths of the contents B and C from the link information 24b, 24c contained in the transmitted information.

The WWW server 18 is arranged to include hyper text transfer protocol daemon (HTTPD), so that the WWW server receives a request signal from the hyper link operation program 16, then reads the server information corresponding to the request signal from the disk device 20 and returns to the hyper link operation program.

The access control table 22 is table information stored in a storage section such as a disk device etc., in which the URLs (server information specified information) of the contents such as the contents A to C stored in e disk device 20 and user names accessible to the contents specified by the URLs are stored correspondingly. A file attribute table provided by the OS, for example, may be used as the access control table 22.

The hyper link operation program 16 receives the request signal from the WWW browser 12 of the client 10 and obtains server information corresponding to the request signal from the WWW server 18. Further, the hyper link operation program 16 obtains user information such as a user name etc. from the client 10 and processes the server information to be transmitted to the client 10 in accordance with the user information.

In this manner, when the link information is contained in the server information to be transmitted to the client 10, the hyper link operation program 16 and the access control table 22 serves as an access permission determining section for determining whether or not a user of the client 10 is permitted to access to the server information which is represented as the destination of a link by the link information. Further, when the access permission determining section determines that the user is not permitted to access to the server information, the hyper link operation program 16 serves as a link information deletion section for transmitting the server information to the client 10 after deleting the link information from the server information.

Figure 3:
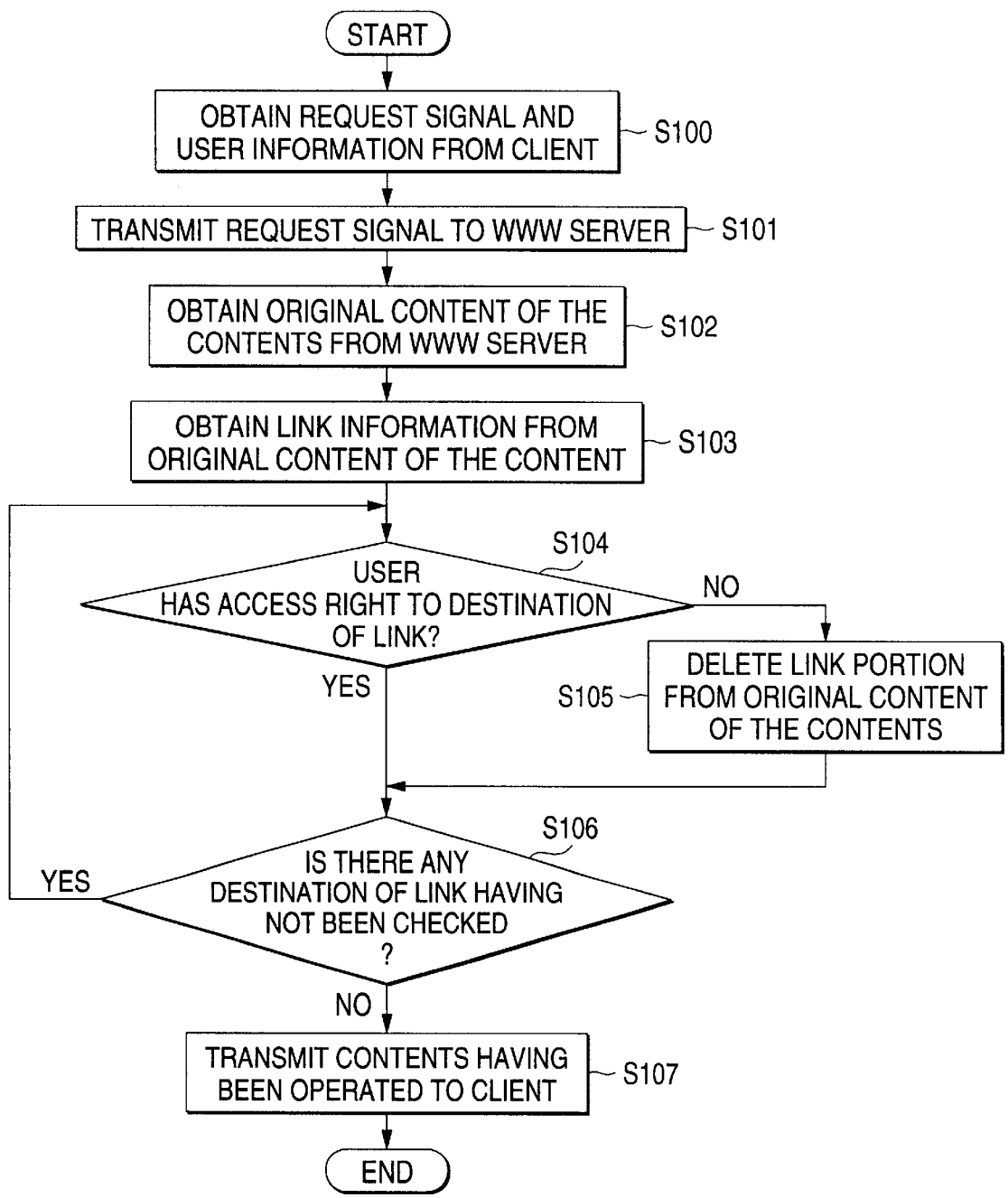
FIG. 3 is a diagram showing a flow chart for explaining the operation of the hyper link operation program of the communication system according to the first embodiment of the present invention.

Then, the explanation will be made as to the communication system having the aforesaid arrangement. FIG. 3 is a flow chart for explaining the operation of the hyper link operation program 16 of the communication system according to this embodiment.

As shown in this figure, firstly, in the server 14, the hyper link operation program 16 obtains a request signal and user information from the client 10 (S100). Then, the hyper link operation program 16 transmits the request signal thus obtained to the WWW server 18 (S101) and receives the original content of the contents corresponding to the request signal from the WWW server (S102). Further, the hyper link operation program 16 extracts the link information from the original content of the contents thus received (S103). For example, when the contents A shown in FIG. 2A is the original content, the link information 24b and 24c are extracted.

Then, the hyper link operation program 16 determines, on the basis of the user information already obtained in the step S100, whether or not a user of the client 10 has access right to the contents represented as the destination of a link by the link information extracted in the step S103 (S104). To be more concrete, the hyper link operation program 16 checks with reference to the access control table 22 whether or not the user specified by the user information obtained in the step S100 is contained within the users which are recorded in the adjacent column of the URL corresponding to the link information extracted in the step S103. When it is determined that the user specified by the user information is contained, it is determined that the user has the access right to the contents. In contrast, when it is determined that the user specified by the user information obtained in the step S100 is not contained, it is determined that the user does not has the access right to the contents.

When it is determined that the user does not have the access right to the contents in the step the link information corresponding to this contents is deleted from the original content of the contents (S105). Then, the similar processing is performed as to each of all the remaining link information extracted in the step S103 (S104, S105). Thereafter, when the determination has been made as to all the link information whether or not the users have the access rights to the server information represented as the destinations of the links (S106), the hyper link operation program 16 transmits to the client 10 the contents having been operated, that is, the contents from which the link information is deleted (S107).

FIGS. 4A and 4B are diagrams for explaining the aforesaid processing of deleting link information from the original content of the contents. FIG. 4A is a diagram showing the contents having been operated which is generated from the hyper link operation program 16 when a user accesses to the contents A shown in FIG. 2A. FIG. 4B is a diagram showing the displayed state of the contents having been operated shown in FIG. 4A at the client 10. When the user A accesses to the contents A shown in FIG. 2A, the link information 24b to the contents B from the contents A and the link information 24c to the contents C from the contents A are extracted from the original contents of the contents A. In this case, as shown by the content of the access control table 22 shown in FIG. 1, the user A has no access right to the contents B. Accordingly, the hyper link operation program 16 deletes the link information 24b to the contents B from the contents A shown in FIG. 2A to generate the contents having been operated shown in FIG. 4A. These contents, having been processed, transmitted to the client 10, then interpreted and processed by the WWW browser 12, and the information shown in FIG. 4B is displayed on the display device.

According to the communication system as described above, the link information relating to the server information to which access right is not permitted is deleted from server information, and the server information from which the link information is thus deleted is transmitted to the client 10. Thus, it is possible to conceal the presence of the server information to which user's access right is not permitted from the user of the client 10 without reducing an amount of information to be displayed by the WWW browser 12 of the client 10.

Embodiment 2

FIG. 5 is a diagram showing the arrangement of the communication system according to a second embodiment of the present invention. As compared with the communication system according to the first embodiment, the communication system shown in this figure is different in that a user authority table 26 and an access control table 28 are provided in place of the access control table 22 and the hyper link operation program 30 performs access control processing by using the contents of these tables. Since the functions of the client 10, WWW server 18 and disc device 20 are same as those of the communication system according to the first embodiment, the explanation thereof are omitted by labeling them with the same reference numerals as those of the first embodiment.

The user authority table 26 correspondingly stores therein user names representing user identification information and authority levels of the users as shown in FIG. 6. In this example, although reference numerals 1 to 3 are employed as the authority levels, alphabets or posts such as "president", "general manager" may be employed in place of the reference numerals.

The access control table 28 correspondingly stores therein URLs (server information specifying information) and access right conditions each representing the authority level of a user who is permitted access to server information (contents) of the corresponding URL, as shown in FIG. 7. For example, it can be read from this figure that the access right to the contents B is permitted to the user having the authority levels 1 and 2.

The hyper link operation program 30 determines user's authority level with reference to the user authority table 26, and further determines with reference to the access control table 28 whether or not the user having the thus determined authority level is permitted to access the server information.

That is, according to this embodiment, the hyper link operation program 30 serving as the access permission determining section determines, unlike the first embodiment, user's authority class and then determines whether or not the access to the server information is permitted in accordance with the determined authority class.

FIG. 8 is a diagram showing a flow chart for explaining the operation of the hyper link operation program 30 of the communication system according to this embodiment. As shown in this figure, firstly, in the server 14, the hyper link operation program 30 obtains a request signal and user information from the client 10 (S200). Then, the hyper link operation program 30 transmits the request signal thus obtained to the WWW server 18 (S201) and receives the original content of the contents corresponding to the request signal from the WWW server (S202). Further, the hyper link operation program 30 extracts the link information from the original content of the contents thus received (S203).

Then, the hyper link operation program 30 obtains the authority level of the user of the client 10 from the user authority table 26 on the basis of the user information already obtained in the step S200 (S204). For example, when a user of the client 10 is the user A, the authority level 3 is obtained from the user authority table 26.

Thereafter, the hyper link operation program 30 reads from the access control table 28 the access right condition relating to the server information which is represented as the destination of a link by the link information obtained in the step S203 (S205). Then, it is determined whether or not the user having the authority level obtained in the step S204 is permitted access to the server information (S206).

When it is determined by the hyper link operation program 30 that the user is not permitted access to the server information, the link information relating to the server information is deleted from the original content of the corresponding contents (S207). Then, similar processing (S205 to S207) is performed as to each of all the remaining link information extracted in the step S203. Thereafter, when the determination has been made as to all the link information whether or not the users have the access rights to the server information represented as the destinations of the links (S208), the hyper link operation program 30 transmits to the client 10 the contents having been operated, that is, the contents from which the link information is deleted (S209).

According to the communication system as described above, the link information directing to the server information to which access right is not permitted is deleted from server information, and the server information from which the link information is thus deleted is transmitted to the client 10. Thus, it is possible to conceal the presence of the server information to which user's access right is not permitted from the user of the client 10 without reducing an amount of information to be displayed by the WWW browser 12 of the client 10. Further, since the permission of the access right can be set by using the authority level, management of the access control can be performed easily.

Embodiment 3

FIG. 9 is a diagram showing the arrangement of the communication system according to a third embodiment of the present invention. As compared with the communication system according to the second embodiment, the communication system shown in this figure is different in that an access control table 32 is provided and a hyper link operation program 34 performs access control processing by using the contents of this table. Since the functions of the client 10, WWW server 18, disc device 20 and user authority table 26 are same as those of the communication system according to the second embodiment, the explanation thereof are omitted by labeling them with the same reference numerals as those of the second embodiment.

As shown in FIG. 10, the access control table 32 correspondingly stores therein URLs (server information specifying information), access right conditions listing user's authority levels, and access URLs each representing a URL to which a user satisfying the corresponding access right condition actually accesses. For example, according to the access control table 32 shown in this figure, when a user having the authority level 1 tries to access to the contents C, the user is actually permitted to access to the contents C. In contrast, when a user having the authority level 3 tries to access to the contents C, the user is not permitted to access to the contents C but permitted to access to the contents D in place of the contents C.

The hyper link operation program 34 determines a user's authority level with reference to the user authority table 26, then reads a URL to which the authority level thus determined is permitted access from the access control table 32, and changes the link information of the server information to be transmitted to the client 10 in a manner that the link information represents the URL thus read as the destination of a link.

According to this embodiment, the access control table 32 serves as a memory section for correspondingly storing the server information specifying information and alternative server information specifying information with respect to the predetermined users, and the hyper link operation program 34 serves as a link information changing section. That is, the access control table 32 and the hyper link operation program 34 serves as a destination of link changing section.

Figure 11:
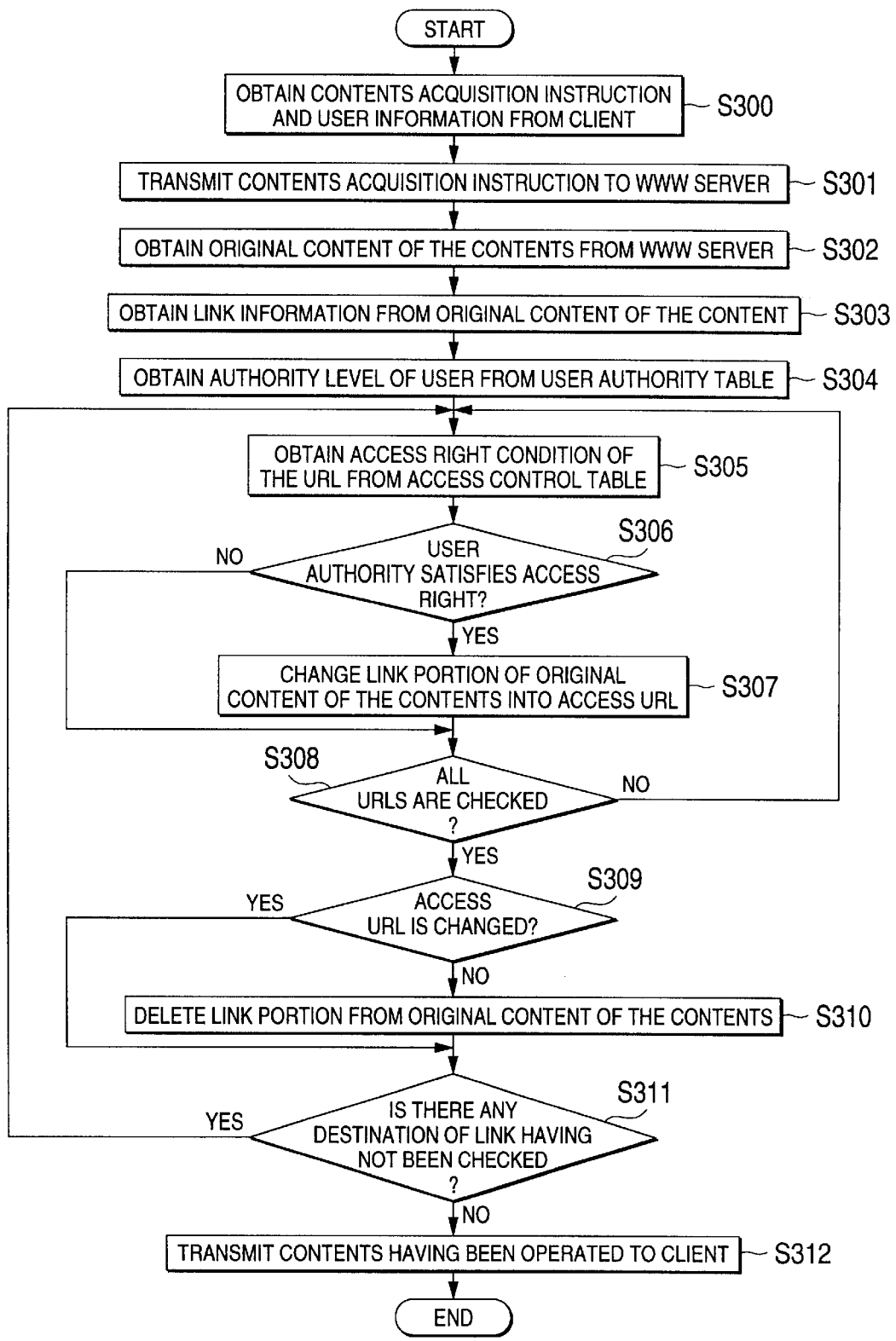
FIG. 11 is a diagram showing a flow chart for explaining the operation of the hyper link operation program of the communication system according to the third embodiment of the present invention.

FIG. 11 is a diagram showing a flow chart for explaining the operation of the hyper link operation program 34 of the communication system according to this embodiment. As shown in this figure, firstly, in the server 14, the hyper link operation program 34 obtains a request signal and user information from the client 10 (S300). Then, the hyper link operation program 34 transmits the request signal thus obtained to the WWW server 18 (S301) and receives the original content of the contents corresponding to the request signal from the WWW server (S302). Further, the hyper link operation program 34 extracts the link information from the original content of the contents thus received (S303).

Then, the hyper link operation program 34 obtains the authority level of the user of the client 10 from the user authority table 26 on the basis of the user information already obtained in the step S300 (S304). Thereafter, the hyper link operation program 34 reads from the access control table 32 the access right condition relating to the server information which is represented as the destination of a link by one of the link information obtained in the step S303 (S305). Then, it is determined whether or not the user having the authority level obtained in the step S304 is permitted access to the server information on the basis of the access right condition thus read (S306). When it is determined that the user is permitted access, the link information of the contents is rewritten in a manner that the access URL stored in the access control table 32 in correspondence with the access right condition thus read is set as the destination of the link (S307). The aforesaid processing (S305 to S307) is repeated until the access right conditions corresponding to all the URLs of the access control table 32 are checked (S308).

When the aforesaid checking processing of all the URLs stored in the access control table 32 is completed, it is determined whether or not the access URL of the link information is changed in the step S308 (S309). When it is determined that the access URL is not changed, it is determined that the user is not permitted access to the contents represented as the destination of a link by the link information and so the link information is deleted from the original content of the contents (S310).

The aforesaid processing is performed as to all the remaining link information extracted in the step S303 (S305 to S310). When the determination has been made as to all the link information whether or not the users have the access rights to the server information represented as the destinations of the links (S311), the hyper link operation program 34 transmits to the client 10 the contents having been operated, that is, the contents in which the link information is changed or deleted (S312).

Figures 12A, 12B, 13:
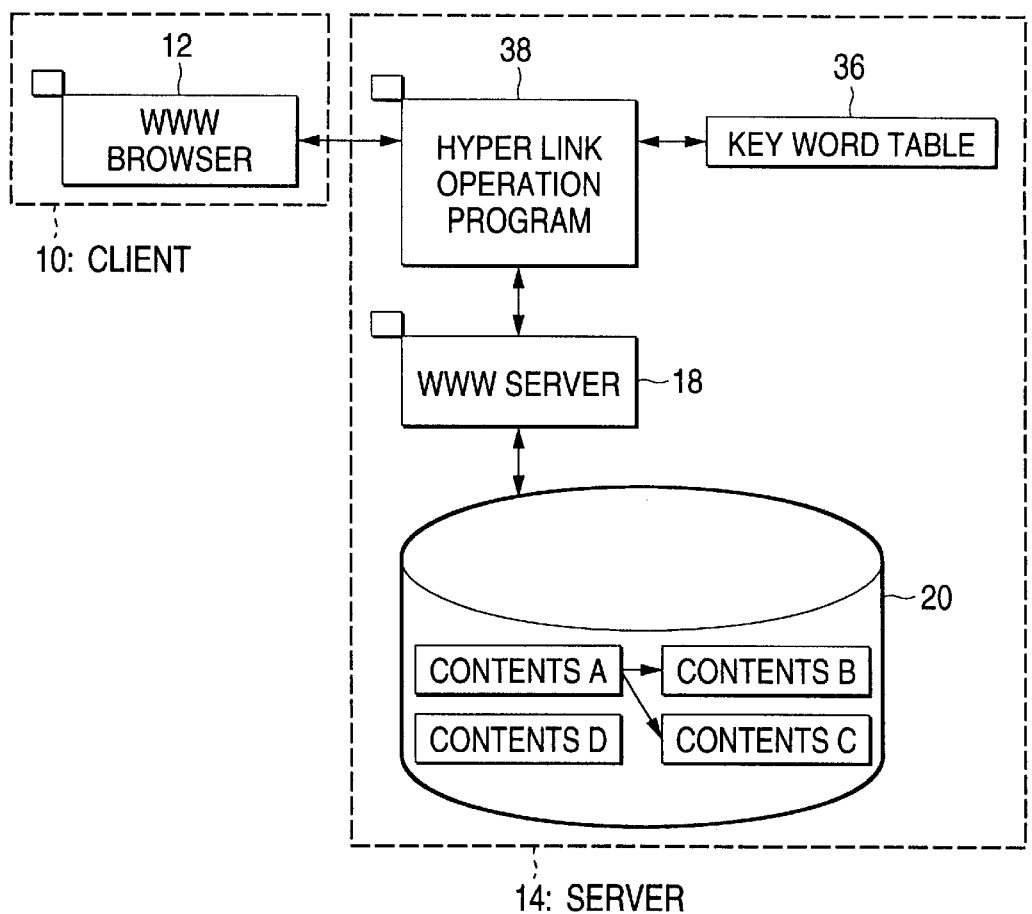
FIGS. 12A and 12B are diagrams for explaining the operation processing of the server information of the hyper link operation program according to the third embodiment of the present invention.
FIG. 13 is a diagram showing the arrangement of the communication system according to a fourth embodiment of the present invention.

FIGS. 12A and 12B are diagrams for explaining the aforesaid processing of changing or deleting link information of the original content of the contents. FIG. 12A is a diagram showing the contents having been operated which is generated from the hyper link operation program 34 when the user A accesses the contents A shown in FIG. 2A. FIG. 12B is a diagram showing the displayed state of the contents having been operated shown in FIG. 12A at the client 10. According to the communication system of this embodiment, the authority level of the user A is 3 as clear from the user authority table 26 shown in FIG. 6. When the user A accesses the contents A shown in FIG. 2A, the link information 24b to the contents B from the contents A and the link information 24c to the contents C from the contents A are extracted from the server information. In this case, as shown by the access control table 32 shown in FIG. 10, the user A with the authority level 3 has no access right to the contents B. Further, as to the contents C, the access URL of the user A with the authority level 3 is not the URL contents C but the URL contents D. Accordingly, the hyper link operation program 34 deletes the link information 24b to the contents B from the contents A shown in FIG. 2A, and changes the link information 24c to the contents C into the link information 24d representing the contents D as the destination of a link. In this manner, the hyper link operation program 34 generates the contents having been operated shown in FIG. 12A. This contents having been operated is transmitted to the client 10, then interpreted and processed by the WWW browser 12, and the information shown in FIG. 12B is displayed on the display device.

According to the communication system as described above, the link information relating to the server information to which access right is not permitted is deleted from server information, and the server information from which the link information is thus deleted is transmitted to the client 10. Thus, it is possible to conceal the presence of the server information to which user's access right is not permitted from the user of the client 10 without reducing an amount of information to be displayed by the WWW browser 12 of the client 10. Further, since the actual destination of a link can be changed depending on the user's authority, it is possible to conceal the presence of the server information represented as the actual destination of a link in a natural form as compared with the case where the link information is merely deleted from the server information. Furthermore, since the permission of the access right can be set depending on the authority level of the user, the management of the access control can be performed easily.

Embodiment 4

FIG. 13 is a diagram showing the arrangement of the communication system according to a fourth embodiment of the present invention. The communication system shown in this figure is characterized, as compared with the communication system according to the aforesaid respective embodiments, in that a key word table 36 is provided and a hyper link operation program 38 performs access control processing by using the contents of this table 36. Since the functions of the client 10, WWW server 18 and disc device 20 are same as those of the communication system according to the aforesaid respective embodiments, the explanation thereof are omitted by labeling them with the same reference numerals as those of the respective embodiments.

As shown in FIG. 14, the key word table 36 correspondingly stores therein key words and access URLs, wherein each of the access URLs represents server information to be linked when a corresponding one of the key words is contained in the server information.

When a key word described in the key word table 36 is contained in the server information which a user has accessed, the hyper link operation program 38 adds, to the original server information, link information representing the access URL corresponding to the key word as a URL representing the destination of a link, thereby generating the server information having been operated. For example, in the key word table 36 shown in FIG. 14, when a user accesses to the server information including the key word "contents A", link information representing the URL contents A corresponding to the key word as a URL representing the destination of a link is added to the server information.

Figure 15:
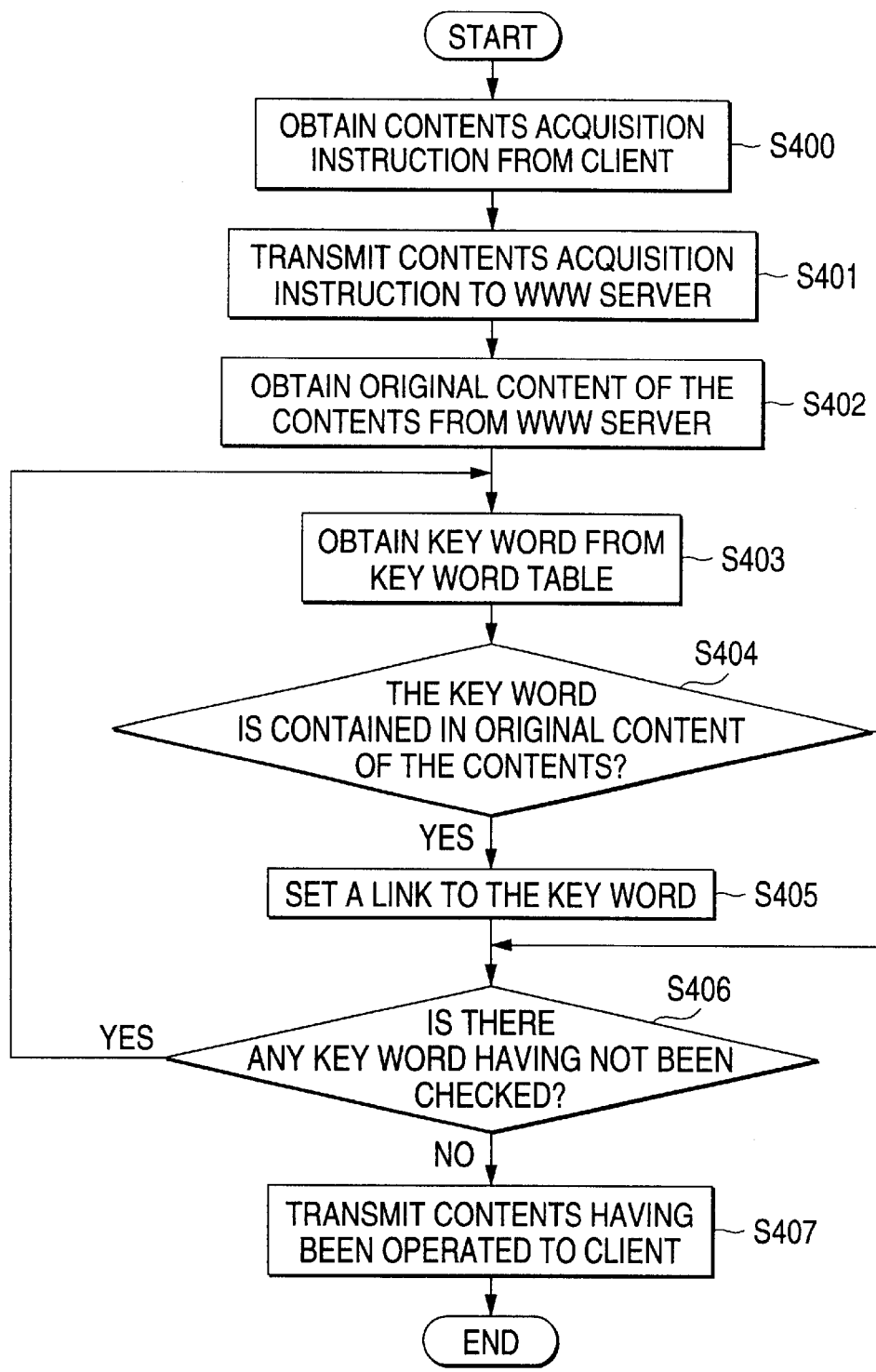
FIG. 15 is a diagram showing a flow chart for explaining the operation of the hyper link operation program of the communication system according to the fourth embodiment of the present invention.

FIG. 15 is a diagram showing a flow-chart for explaining the operation of the hyper link operation program 38 of the communication system according to this embodiment. As shown in this figure, firstly, in the server 14, the hyper link operation program 38 obtains a request signal from the client 10 (S400). Then, the hyper link operation program 38 transmits the request signal thus obtained to the WWW server 18 (S401) and receives the original content of the contents corresponding to the request signal from the WWW server (S402).

Then, the hyper link operation program 38 obtains a key word from the key word table 36 (S403). For example, a character sequence "contents A", character sequence "contents B", character sequence "contents C" - - - are sequentially obtained as the key words from the key word table 36 of FIG. 14. Then, when the key word thus obtained is contained in the original content of the contents received from the WWW server 18 in the step S402 (S404), link information which represents the access URL stored in the key word table 36 corresponding to the key word as a destination of a link is added to the original content of the contents (S405).

The aforesaid processing (S403 to S405) is performed as to the next key word until the determination has been made as to each of all the remaining key words recorded in the key word table 36 whether or not the key word is contained in the original content of the contents (S406). When the determination has been made as to all the key words (S406), the hyper link operation program 38 transmits to the client 10 the contents having been operated, that is, the contents in which the link information is set (S407).

FIGS. 16A to 16C are diagrams for explaining the aforesaid processing of generating the server information having been operated from the original content of the contents. FIG. 16A shows the original content of the contents. FIG. 16B is a diagram showing the server information having been operated which is generated from the contents. FIG. 16C is a diagram showing the displayed state of the server information having been operated.

The key word table 36 contains therein the character sequence "contents A" as the key word as shown in FIG. 14. Thus, when a user accesses to the contents shown in FIG. 16A, "<A href=URL contents A>" and "</A>" are respectively added as the link information before and after the "contents A" in correspondence with the "contents A". In this respect, "URL contents A" is information representing a URL as the destination of a link and stored in the key word table 36 in correspondence with the key word "contents A".

Like the case of the "contents A", "<A href=URL contents B>" and "</A> are respectively added as the link information before and after the "contents B" in correspondence with the "contents B", and further "<A href=URL contents C>" and "</A>" are respectively added as the link information before and after the "contents C" in correspondence with the "contents C".

In this manner, the hyper link operation program 38 generates the contents having been operated shown in FIG. 16B. This contents having been operated is transmitted to the client 10, then interpreted and processed by the WWW browser 12, and the information shown in FIG. 16C is displayed on the display device at the client 10.

According to the communication system as described above, it is possible not to contain the link information such as a path name etc. of the server information as the destination of a link in the original server information. Further, since the path name etc. can be recorded only in the key word table 36, the information relating to the access procedure to the server information as the destination of a link can be managed concentrically, whereby the presence of the server information as the destination of a link can be prevented from being leaked to a user.

Embodiment 5

This embodiment relates to the combination of the aforesaid fourth embodiment and one of the second and third embodiments. In this embodiment, a key word access control table 40 shown in FIG. 17 is provided in place of the access control table 22 of FIG. 1 so that the hyper link operation program 16 performs the operation processing of the server information by using this table.

The key word access control table 40 shown in FIG. 17 correspondingly stores therein key words, access right conditions listing user's authority levels, and access URLs each representing a URL of server information as the destination of a link when a key word is contained in the server information to which a user satisfying the corresponding access right condition has accessed. According to the key word access control table 40, when the key word "contents B" is contained in the server information to which a user with the authority level 2 accessed, "<A href=URL contents B>" and "</A>" are respectively added as the link information before and after the key word.

Figure 18:
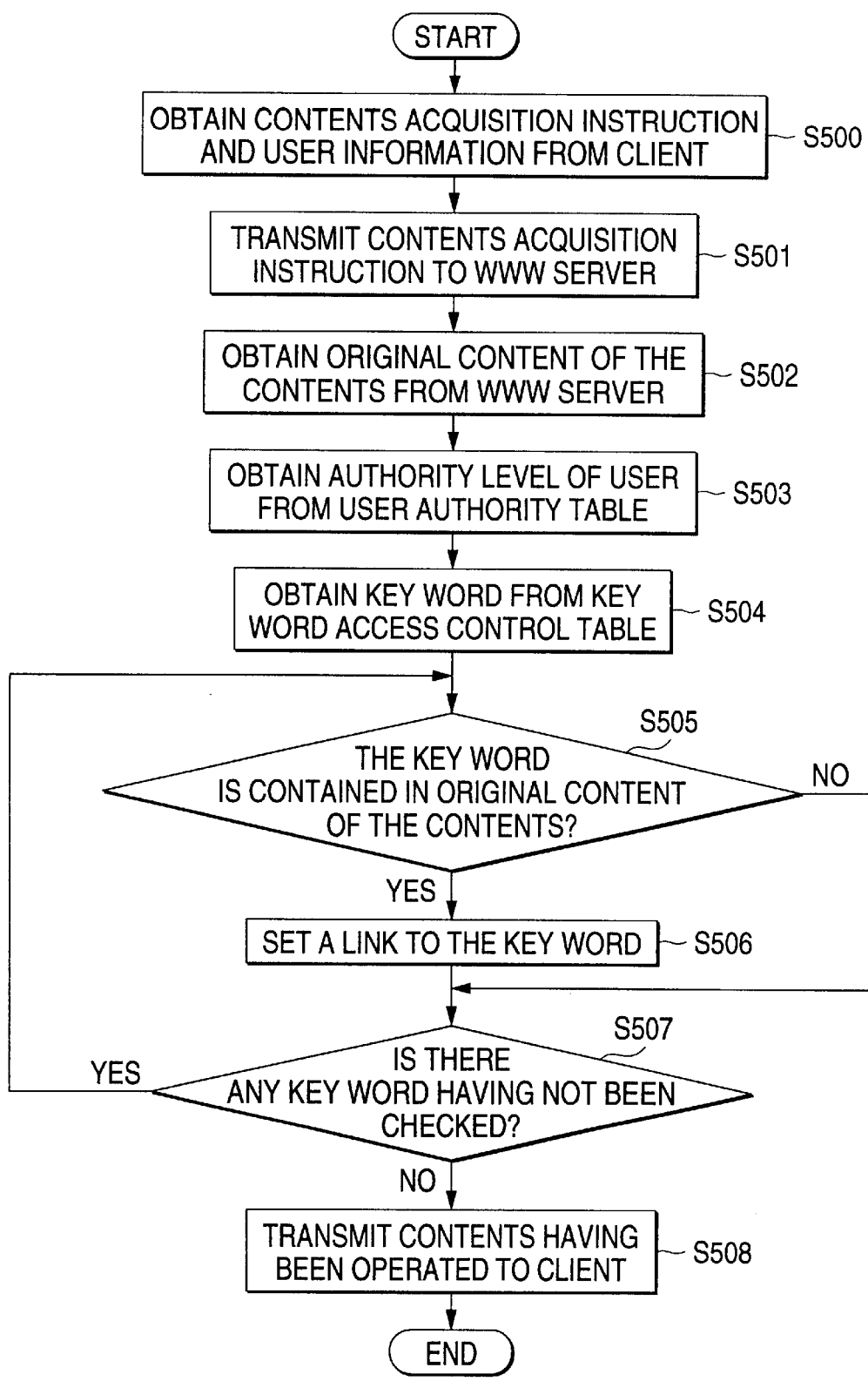
FIG. 18 is a diagram showing a flow chart for explaining the operation of the hyper link operation program of the communication system according to the fifth embodiment of the present invention.

FIG. 18 is a diagram showing a flow chart for explaining the operation of the hyper link operation program 16 of the communication system according to this embodiment. As shown in this figure, firstly, in the server 14, the hyper link operation program 16 obtains a request signal and user information from the client 10 (S500). Then, the hyper link operation program 16 transmits the request signal thus obtained to the WWW server 18 (S501) and receives the original content of the contents corresponding to the request signal from the WWW server (S502). Further, the hyper link operation program 16 obtains the authority level of the user from the user authority table 26 (S503).

Then, the hyper link operation program 16 extracts one or more key words, from those stored in the key word access control table 40, which correspond to the authority level obtained in the step S503 and listed in the column of the access right condition of this table (S504). For example, when a user with the authority level 3 accesses the server 14, the character sequence "contents A" and the character sequence "contents C" are sequentially obtained as the key words from the key word access control table 40 shown in FIG. 17.

Then, when the key word thus obtained is contained in the original content of the contents received from the WWW server 18 in the step S502 (S505), link information which represents the access URL stored in the key word access control table 36 corresponding to the key word as a destination of a link is added to the original content of the contents (S506).

The processing similar to the aforesaid processing (S505, S506) is performed as to other key words until all the remaining key words are checked (S507). When all the key words have been checked (S507), the hyper link operation program 16 transmits to the client 10 the contents having been operated, that is, the contents in which the link information is set (S508).

FIGS. 19A to 19C are diagrams for explaining the operation processing of the server information using the access control table 22 shown in FIG. 17 when a user with the authority level 3 accesses the server 14. FIG. 19A shows the original content of the contents. FIG. 19B is a diagram showing the server information having been operated which is generated from the contents for the user A. FIG. 19C is a diagram showing an example of the displayed state of the server information having been operated.

In the key word table 36, key words at which link information for a user with the authority level 3 is to be set are the character sequence "contents A" and the character sequence "contents C". Thus, in the communication system according to this embodiment, "<A href=URL contents A>" and "</A>" are respectively added as the link information before and after the character sequence "contents A" in the original contents shown in FIG. 19A. Similarly, "<A href=URL contents C>" and "</A>" are respectively added as the link information before and after the "contents C" in correspondence with the "contents C".

In this manner, the hyper link operation program 16 generates the contents having been operated shown in FIG. 19B. This contents having been operated is transmitted to the client 10, then interpreted and processed by the WWW browser 12, and the information shown in FIG. 19C is displayed on the display device at the client 10.

A key word access control table 42 shown in FIG. 20 may be employed in place of the key word access control table 40 shown in FIG. 17. In this table, different records are recorded for some key words in a manner that these records differ in the access right condition and the access URL. Thus, as to the some key words, when a user with another authority level accesses to the server 14, another URL can be set as the destination of a link. For example, when a user with the authority level 1 accesses to the server 14, "<A href=URL contents C>" and "</A>" are respectively added as the link information before and after the key word "contents C". In contrast, when a user with the authority level 3 accesses to the server 14, "<A href=URL contents D>" and "</A>" are respectively added as the link information before and after the key word "contents C". When the authority level is other than 1 and 3, no link information is set as to the key word "contents C".

FIGS. 21A to 21C are diagrams for explaining the operation of the server information using the key word access control table 42 shown in FIG. 20 when a user with the authority level 3 accesses the server 14. FIG. 21A shows the original content of the contents. FIG. 21B is a diagram showing the server information having been operated which is generated from the contents for the user with the authority level 3. FIG. 21C is a diagram showing an example of the displayed state of the server information having been operated.

In the key word access control table 42, key words at which link information for a user with the authority level 3 is to be set are the character sequence "contents A" and the character sequence "contents C". Thus, in the communication system according to this embodiment, "<A href=URL contents A>" and "</A>" are respectively added as the link information before and after the character sequence "contents A" in the original contents shown in FIG. 21A. In contrast, since the "URL contents D" is recorded as an access URL in correspondence with the key word "contents C" in the key word access control table 42, "<A href=URL contents D>" and "</A>" are respectively added as the link information before and after the "contents C" in the original contents.

In this manner, the hyper link operation program 16 generates the contents having been operated shown in FIG. 21B. This contents having been operated is transmitted to the client 10, then interpreted and processed by the WWW browser 12, and the information shown in FIG. 21C is displayed on the display device at the client 10.

According to this embodiment, it is possible not to contain the link information such as a path name etc. of the server information as the destination of a link in the original server information. Further, since the path name etc. can be recorded only in the key word access control tables 40 and 42 the information relating to the access procedure to the server information as the destination of a link can be managed concentrically, whereby the presence of the server information as the destination of a link can be prevented from being leaked to a user.

Further, the link information relating to the server information to which access right is not permitted is deleted from server information, and the server information from which the link information is thus deleted is transmitted to the client 10. Thus, it is possible to conceal the presence of the server information to which user's access right is not permitted without reducing an amount of information to be displayed by the WWW browser 12 of the client 10. Furthermore, since the actual destination of a link can be changed depending on the user's authority, it is possible to conceal the presence of the server information represented as the actual destination of a link in a natural form as compared with the case where the link information is merely deleted from the server information. Furthermore, since the permission of the access right can be set by using the authority level of the user, the management of the access control can be performed easily.

According to the present invention explained above, when the link information directing to server information to which access right is not permitted is contained in server information, the link information is deleted from the server information and the server information from which the link information is thus deleted is transmitted to the client. Thus, it is possible, without reducing an amount of information to be displayed based on the server information accessed for the first time, to conceal the presence of server information to which user's access right is not permitted from the user among server information linked to the server information thus accessed for the first time.

Further, according to the present invention, since the permission of the access right to the server information is determined depending on the class of a user such as an authority level, the presence of the server information can be concealed in a further natural form, and further the management of the access permission for a user can be made more easily.

Further, according to the present invention, since the link information contained in the server information with respect to a predetermined user is changed in a manner that the link information represents other server information as the destination of a link, it is possible to conceal the presence of the actual server information from the user. Furthermore, in this case, it is possible to maintain the server information in a natural form as compared with the case where the link information is merely deleted from the server information. Accordingly, even when the user looks the server information, it is possible to conceal from the user that the server information has been subjected to the change or the like.

Further, according to the present invention, since the link information can be added to the key word, it is possible not to contain the link information in the in the original server information. Accordingly, the presence of the server information being linked can be easily concealed from the user. Further, since the link information can be managed concentrically in a file different from the original server, the presence of the server information can be more easily concealed from the user.

Further, according to the present invention, at the time of adding the link information to the key word, the link information is added depending on the class of a user. Accordingly, when the server is arranged in a manner that the link information is not added with respect to users of a predetermined class, the presence of the server information to be originally linked can be concealed from such users.

Furthermore, according to the present invention, since the different link information can be added depending on the classes of users, the destination of a link can be changed at every class of a user. Accordingly, the presence of actual server information can be concealed from a user of a predetermined class.

What is claimed is:
1. A server comprising:
  link destination changing means for changing, when server information is transmitted to a specific user, link information contained in the server information so that the link information represents, as a destination of the link, second server information different from first server information represented by the link information, said link destination changing means including:
    memory means for storing, with respect to the specific user, server specifying information for specifying the first server information and corresponding alternative server specifying information for specifying the second server information to be transmitted to a user in place of the first server information, and link information changing means for changing, when a user of a client is the specific user and server information to be transmitted to the client includes link information representing the first server information specified by the server specifying information stored in said memory means, as a destination of a link, the link information so that the link information represents, as a new destination of a link, the second server information specified by the alternative server specifying information stored in said memory means in correspondence with the server specifying information corresponding to the link information.

2. The A server according to claim 1, wherein the specific user is determined on a basis of a class of user's authorization.

3. The server according to claim 1, comprising memory means further storing a user authority table comprising user identification information in association with authority level information, and an access control table comprising the authority level information, wherein said link information changing means changes the link information by matching the user authority table and the access control table.

4. A server comprising:

access permission determining means for determining whether a user of a client is permitted access to first server information, the first server information being linked to second server information, the second server information including contents to be displayed at a client and link information designating a destination of a link to the first server information, the link information being associated with a part of the contents;

link information deletion means for deleting the link information from the second server information when said access permission determining means determines that the user of the client is denied access to the first server information; and transmitting means for transmitting the second server information from which the link information has been deleted by said link information deletion means to the client via a network while the part of contents is included in the second server information.

5. The server according to claim 4, wherein said access permission determining mans determines a class of a user's authorization and determines, depending upon the class of the user's authorization, whether the user is permitted to access the first server information.

6. The server according to claim 5, comprising memory means storing a user authority table comprising user identification information in association with authority level information, and an access control table comprising server specifying information specifying the first server information, wherein said access permission determining means determines whether the user is permitted access to the first server information by matching the user authority table and the access control table.

7. The server according to claim 4, wherein the part of contents includes text to be displayed at the client; and the link information includes a uniform resource locator (URL) designating the destination of the link when the user selects the text at the client.

8. The server according to claim 7, wherein the line information includes a tag controlling appearance of the text; and said link information deletion means deletes the tag and the URL.

9. The server according to claim 4, comprising a memory device storing a table including a uniform resource locator in association with a plurality of user identifications, wherein said access permission determining means determines whether the user of the client is permitted access to the first server information based on the table.

10. The server according to claim 4, comprising a World Wide Web server accessing a disk device storing the second server information, wherein said link information determining means accesses said World Wide Web server to retrieve the second server information.

11. The server according to claim 4, wherein access permission determining means determines whether the user has already accessed the destination of the link when said access permission determining means receives a request signal from the client and, if so, permits the user access to the link.

* * * * *